(12) United States Patent
Merchant et al.

(10) Patent No.: US 6,680,945 B1
(45) Date of Patent: *Jan. 20, 2004

(54) METHOD AND APPARATUS FOR SUPPORT OF TAGGING AND UNTAGGING PER VLAN PER PORT

(75) Inventors: Shashank Merchant, Sunnyvale, CA (US); Robert A. Williams, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/317,145

(22) Filed: May 24, 1999

(51) Int. Cl.[7] .............................................. H04L 12/56
(52) U.S. Cl. ............................... 370/395.53; 370/395.1
(58) Field of Search .......................... 370/395.53, 401, 370/389, 392

(56) References Cited

U.S. PATENT DOCUMENTS

| | | | | |
|---|---|---|---|---|
| 5,515,376 A | | 5/1996 | Murthy et al. | |
| 6,151,322 A | * | 11/2000 | Viswanath et al. | 370/395.53 |
| 6,157,647 A | * | 12/2000 | Husak | 370/401 |
| 6,269,098 B1 | * | 7/2001 | Crayford | 370/389 |
| 6,460,088 B1 | * | 10/2002 | Merchant | 709/236 |
| 6,490,280 B1 | * | 12/2002 | Leung | 370/392 |
| 6,515,993 B1 | * | 2/2003 | Williams et al. | 370/395.53 |

* cited by examiner

Primary Examiner—Chau Nguyen
Assistant Examiner—Keith M. George (57) ABSTRACT

An integrated multiport switch operating in a packet switched network provides the capability via distributed egress logic to alter VLAN tags on a port by port basis. An internal rules checker (IRC) analyzes the header of a data frame to determine the frame type: untagged, VLAN-tagged, or priority-tagged. The IRC searches the untagged set table for the set of ports that are untagged for a particular VLAN. The IRC passes a forwarding descriptor that includes the frame type and a operational code (opcode) to a Port Vector FIFO logic (PVF). The PVF is responsible for creating a new opcode that instructs a dequeuing logic to add, remove, modify the VLAN tag, or send the frame unmodified. The opcodes generated by the PVF are individualized for each output port.

16 Claims, 9 Drawing Sheets

| Destination Address (6B) | Source Address (6B) | Type/Length (2B) | Data (46B - 1500B) | FCS (4B) |

FIG. 4b
PRIOR ART

| Destination Address (6B) | Source Address (6B) | VLAN TPID (2B) | TCI (2B) | Orig Type/Length (2B) | Original Data (46B - 1500B) | New FCS (4B) |

METHOD AND APPARATUS FOR SUPPORT OF TAGGING AND UNTAGGING PER VLAN PER PORT

BACKGROUND OF THE INVENTION

1. Technical Field

The present invention relates to data communication networking devices, more particularly, to data network switches capable of communicating data frames to both local area networks and virtual local area networks.

2. Background Art

A multiport data network switch conventionally permits data communication among a plurality of media stations in a local area network. Each station in the network is associated with a port of the switch. Data frames, or packets, are transferred between stations by means of data network switch media access control (MAC) circuitry, or "engines," for each switch port. The network switch passes data frames received from a transmitting station to a destination station based on the header information in the received data frame.

The switch can link the network to other networks through one or more predesignated switch ports. The capability thus exists for creating logical workgroups of users who may be physically separated from each other. Members of a workgroup may be coupled directly with the switch in the local area network, while other members of the workgroup may be coupled to one or more remote networks that are linked to the switch at a designated port. These groupings can be thought of as virtual local area networks (VLANs) or "sub-networks" within a larger network. VLAN groupings can provide privacy and security to their members while enabling "broadcast domains" whereby broadcast traffic is kept "inside" the VLAN.

Data packets communicating within the VLAN require information that identifies the VLAN grouping, or VLAN type, and VLAN ID assigned to the station. Such information, or "tag," is provided as additional fields in the frame header. The frame format for such packets thus is expanded relative to the standard frame format. For example, the Ethernet ANSI/IEEE 802.3 standard untagged frame format and 802.1d standard tagged frame format are illustrated, respectively, in FIGS. 4a and 4b.

Figure 4A:
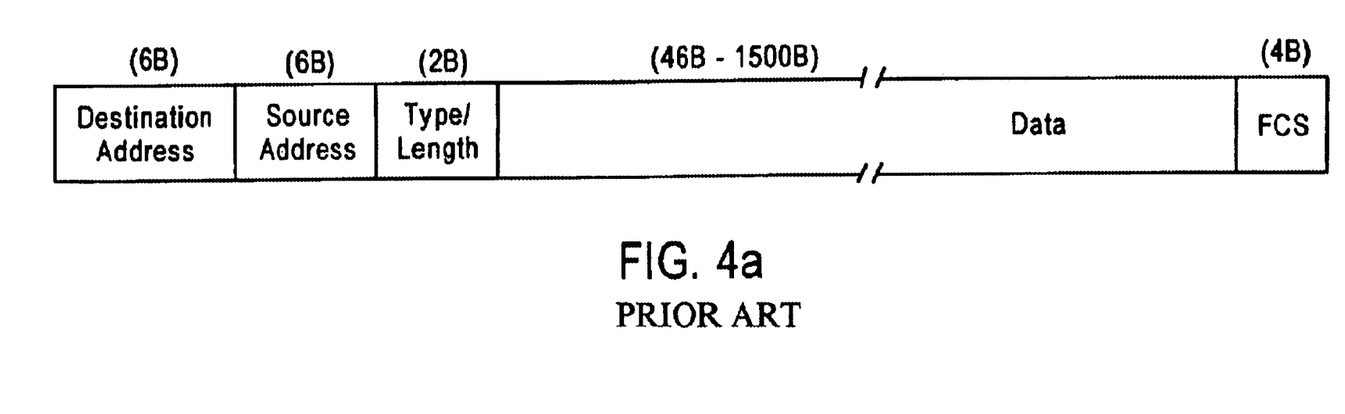
FIGS. 4a and 4b are diagrams, respectively, of untagged and tagged frame formats as provided by the IEEE 802 standard.
Figure 4B:
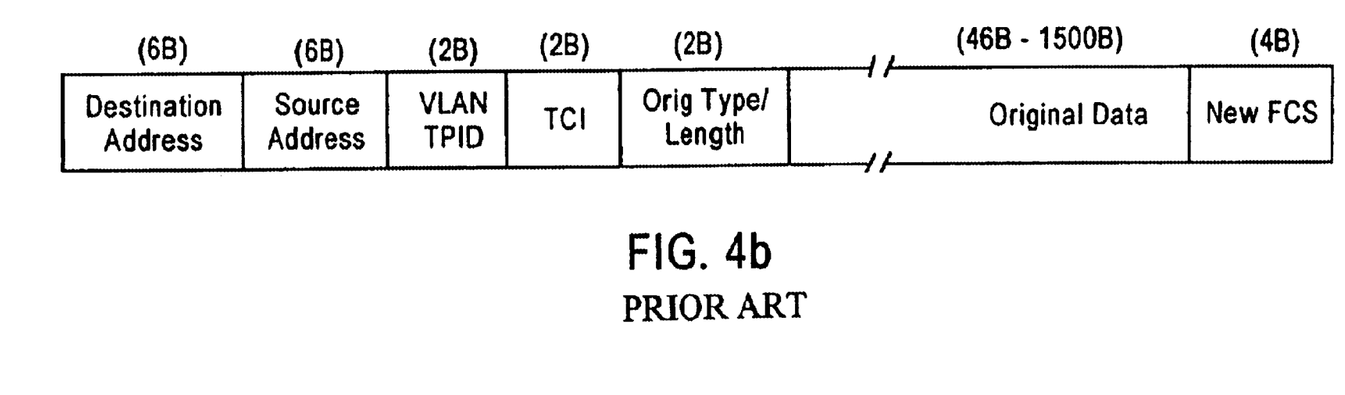

The untagged frame format, shown in FIG. 4a, includes a header portion that allocates six bytes for destination address, six bytes for source address, and two bytes for type/length. The data portion is not fixed in length, but has a permissible range between forty-six and fifteen hundred bytes. A four byte frame check sequence (FCS) follows the data portion. Under Ethernet protocol, the maximum packet length for untagged packets is 1518 bytes. The tagged frame format, shown in FIG. 4b, provides for a 2 byte VLAN Tag Protocol Identifier (TPID) field and a 2 byte Tag Control Information (TCI) field positioned between the source address field and the length field. The frame format for VLAN tagged frames thus is extended in length with respect to the untagged frames. The maximum packet length for such tagged packets is 1522 bytes.

These multiple header format standards impose challenges in the management of data communication by the switch. In addition to its various switching functions that are based on header information, the switch must monitor whether packets are within maximum permissible lengths. Determination of whether a given packet that is of a length between 1518 bytes and 1522 bytes, is within the permissible maximum byte length, requires recognition of whether or not the frame is a tagged frame. Inasmuch as this information is located in header fields that only exist in tagged frames, a technique must be found to distinguish the third header field of each frame as either a type/length field or a VLAN TPID field. As a further complication, tagged frames are only permissible for designated VLAN ports, i.e., "tagged ports." A frame of 1522 bytes length may be considered oversized even though tagged, if it has been received at a port not designated for VLAN communication. Thus, permissible length determination also must account for port authorization. Conversely, a frame communicated via a tagged port may or may not be a tagged frame. A frame of 1522 bytes length that has been received at a tagged port thus would be oversized if it were not a tagged frame. Recognition of a frame as a tagged frame by the switch is also required for directing the frame to an appropriate output port. The switch, however, has no indication that an incoming frame is tagged prior to receiving the VLAN type field with the frame.

Other switch functionalities, and conformance with external network interaction, will often require conversion of a tagged frame to untagged format. For example, a tagged packet, received at a VLAN tagged port, may require transmission to a network station coupled to an untagged port. Also, if the VLAN header information is no longer otherwise necessary, continued storage of such data becomes inefficient from the standpoint of transmission bandwidth. The switch must be capable of stripping the tag information from the frame header at appropriate stages of operation. The switch must also be capable of reconverting a stripped frame to tagged format if the packet is to be transmitted to a VLAN destination via a tagged port. In addition, the switch should be able to pass untagged frames without modification when required. The processing load that is required to support the manipulation of these frames can be quite intensive at times. Therefore, concentrating this load in a single, centralized frame forwarding logic circuit, as in conventional implementations, could result in system performance degradations. In particular, the centralized frame forwarding logic could become the bottleneck of the system. Further, the system is less reliable when compared to a distributed logic implementation.

SUMMARY OF THE INVENTION

There exists a need for a switching device that generates frame forwarding information for various types of data transmissions in a VLAN environment, including transmissions that do not utilize VLAN tags—i.e., tagging and untagging of data frames per VLAN on a per port basis. There is also a need for distributing the process of manipulating VLAN tags to avoid processing bottlenecks in the system and to increase system reliability.

These and other needs are attained by the present invention, where an internal rules checker and port vector FIFO logic (PVF) cooperatively process data frames to add, strip, or modify VLAN tags. The internal rules checker sends a forwarding descriptor, which contains information about the frame type and operation code information, to the port vector FIFO logic. In turn, the port vector FIFO logic selectively manipulates the VLAN tags and accordingly instructs the dequeuing logic in the output ports on a port-by-port basis on how to transfer the data frames. Under this arrangement, the forwarding logic (i.e., egress logic) is shared between the internal rules checker and the PVF. Distribution of forwarding logic in this manner enhances speed of processing.

According to one aspect of the present invention, a multiport switch is configured for transferring a data frame to a network node. The multiport switch comprises a plurality of output ports for transmitting the data frame. A rules checker logic determines the data frame type based upon header information of the data frame; the rules checker logic also generates a corresponding forwarding descriptor. A port logic receives the forwarding descriptor and generates a modified forwarding descriptor in response to the received forwarding descriptor. The modified forwarding descriptor comprises an operation code that includes a tag operation for modifying the data frame based upon the frame type and untagged set information. The untagged set information specifies on a VLAN by VLAN basis which one or more of the output ports is a member of an untagged set. The tag operation included inserting a VLAN tag into the header information, stripping the VLAN tag from the header information, modifying the VLAN tag of the header information, and transmitting the data frame via one or more of the outputs without modifying the VLAN tag of the header information.

Still another aspect of the present invention provides a method for processing a data frame. The method comprises determining the data frame type based upon header information of the data frame and generating a corresponding forwarding descriptor by a first logic. A second logic receives the forwarding descriptor. The method includes generating a modified forwarding descriptor based upon the received forwarding descriptor by the second logic. The modified forwarding descriptor comprises an operation code that includes a tag operation for modifying the data frame based upon the frame type and untagged set information. The untagged set information specifies on a VLAN by VLAN basis which one or more of the output ports is a member of an untagged set. The tag operation includes inserting a VLAN tag into the header information, stripping the VLAN tag from the header information, modifying the VLAN tag of the header information, and transmitting the data frame via one or more of the outputs without modifying the VLAN tag of the header information.

Additional advantages and novel features of the invention will be set forth in part in the description which follows, and in part may become apparent to those skilled in the art upon examination of the following or may be learned by practice of the invention. The advantages of the invention may be realized and attained by means of the instrumentalities and combinations particularly pointed out in the appended claims.

DETAILED DESCRIPTION OF ILLUSTRATIVE EMBODIMENTS

The present invention will be described with the example of a switch operating in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
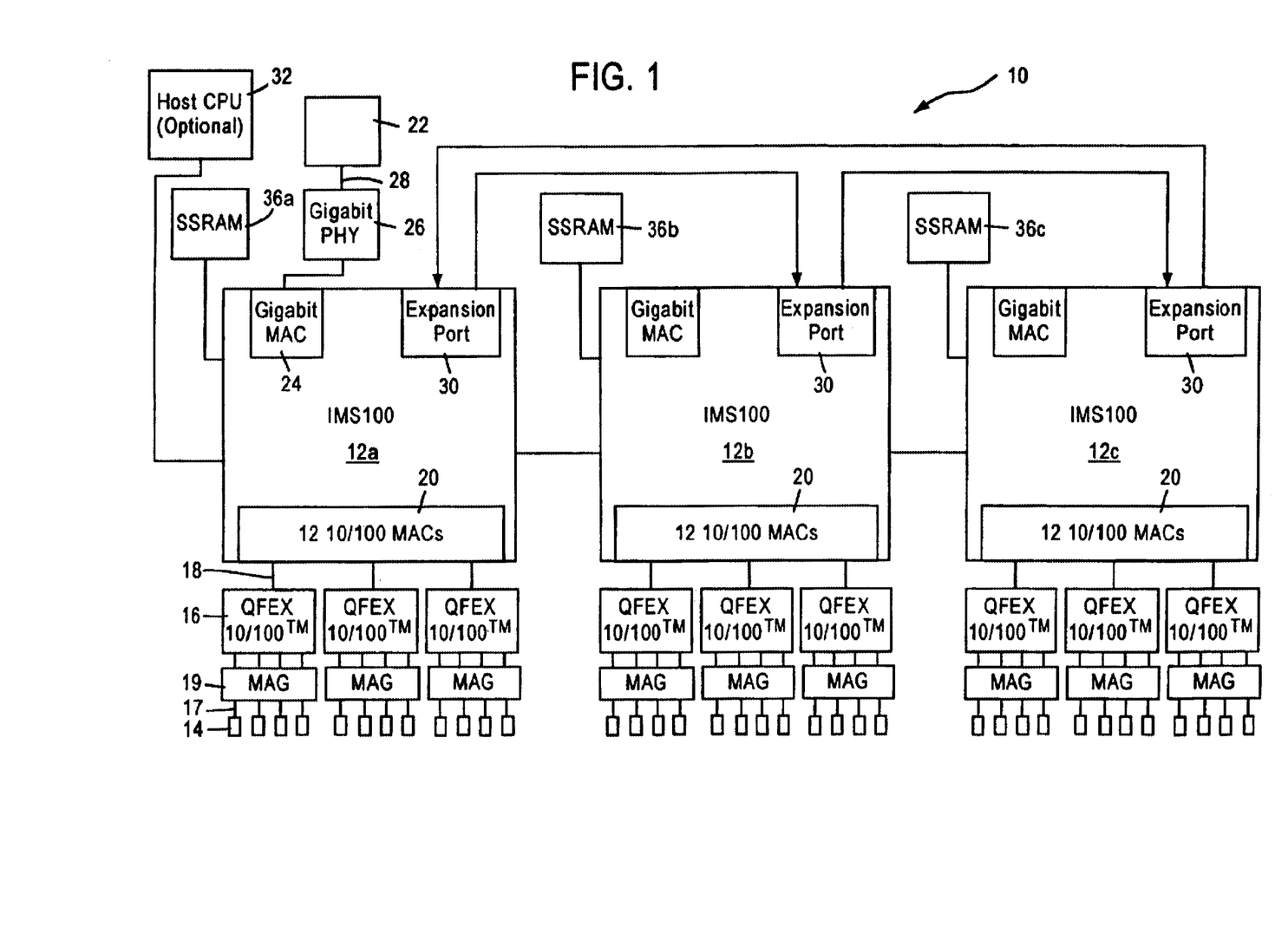
FIG. 1 is a block diagram of a packet switched network including a multiple port switch.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
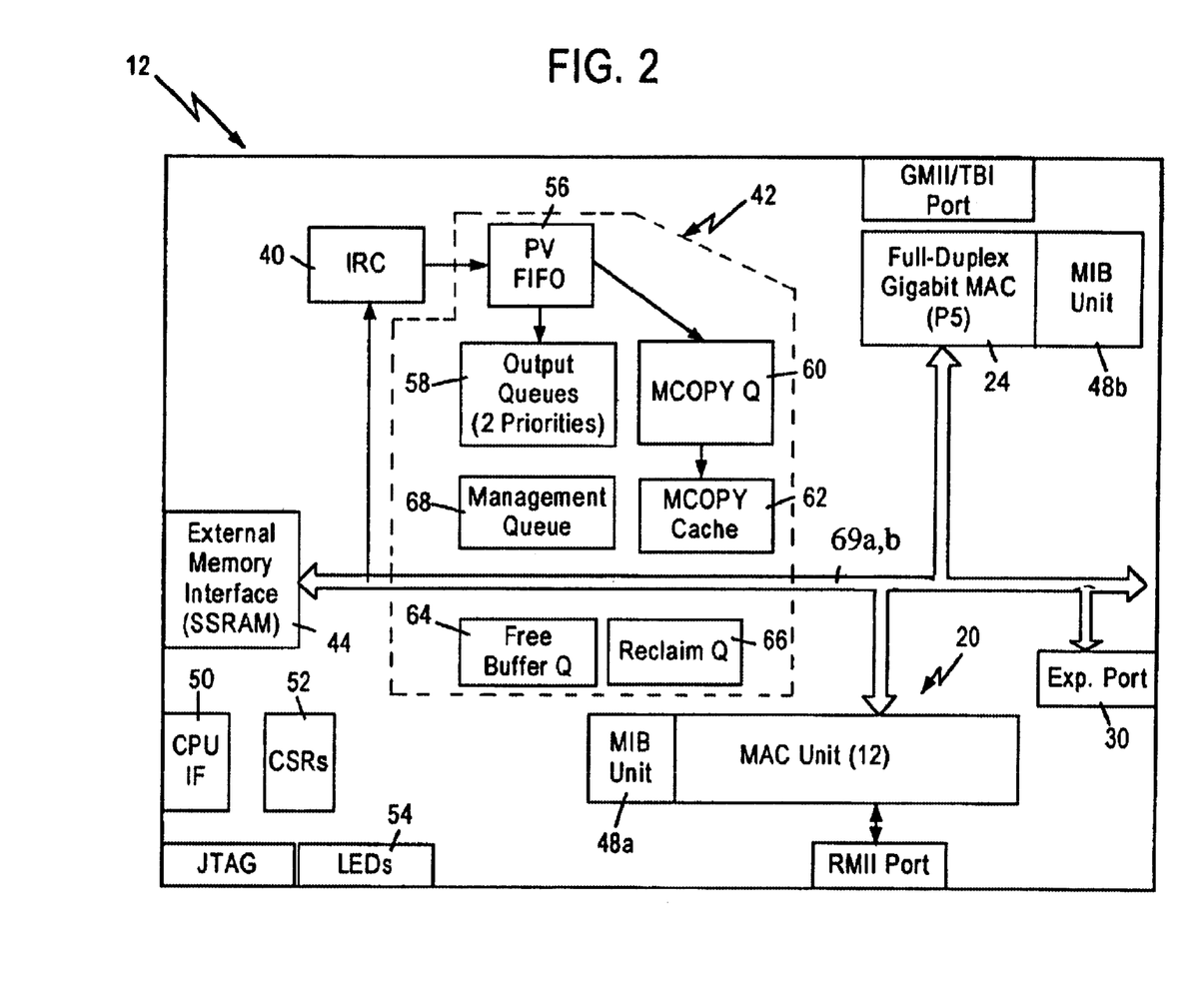
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnarounds (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor include a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The format of the forwarding descriptor will be discussed further with respect to FIG. 7. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 35 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figures 3, 3A:
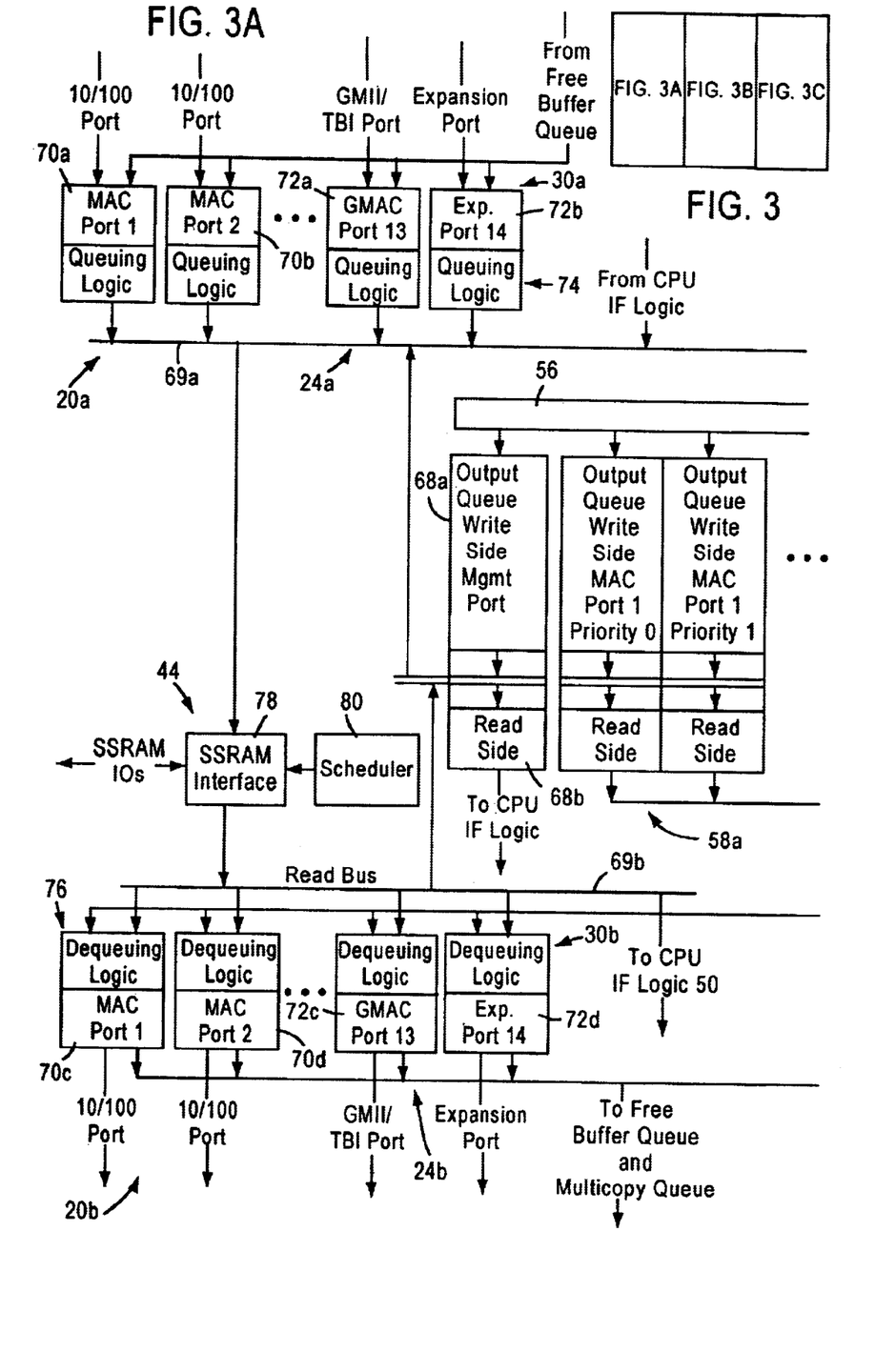
FIG. 3 is a block diagram illustrating in detail the switching subsystem of FIG. 2.
Figure 3B:
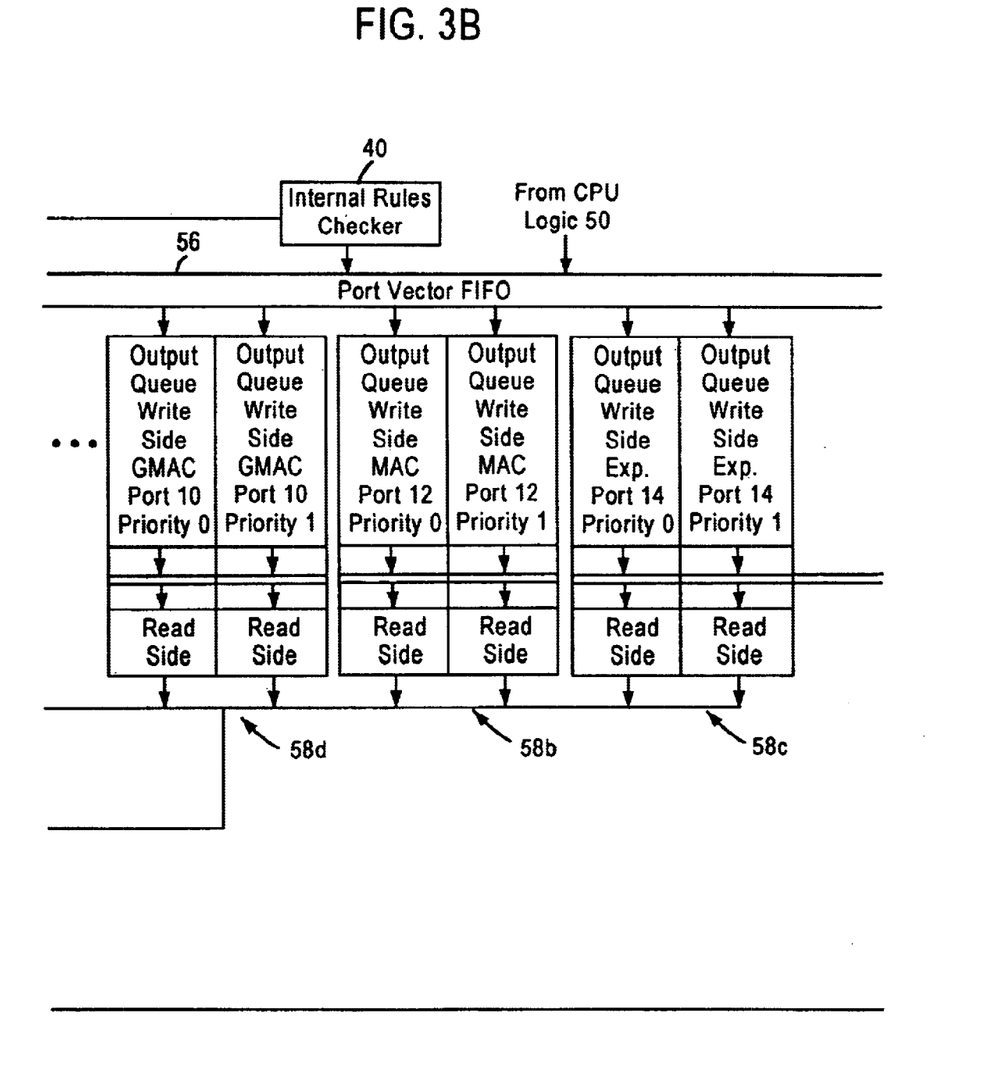
Figure 3C:
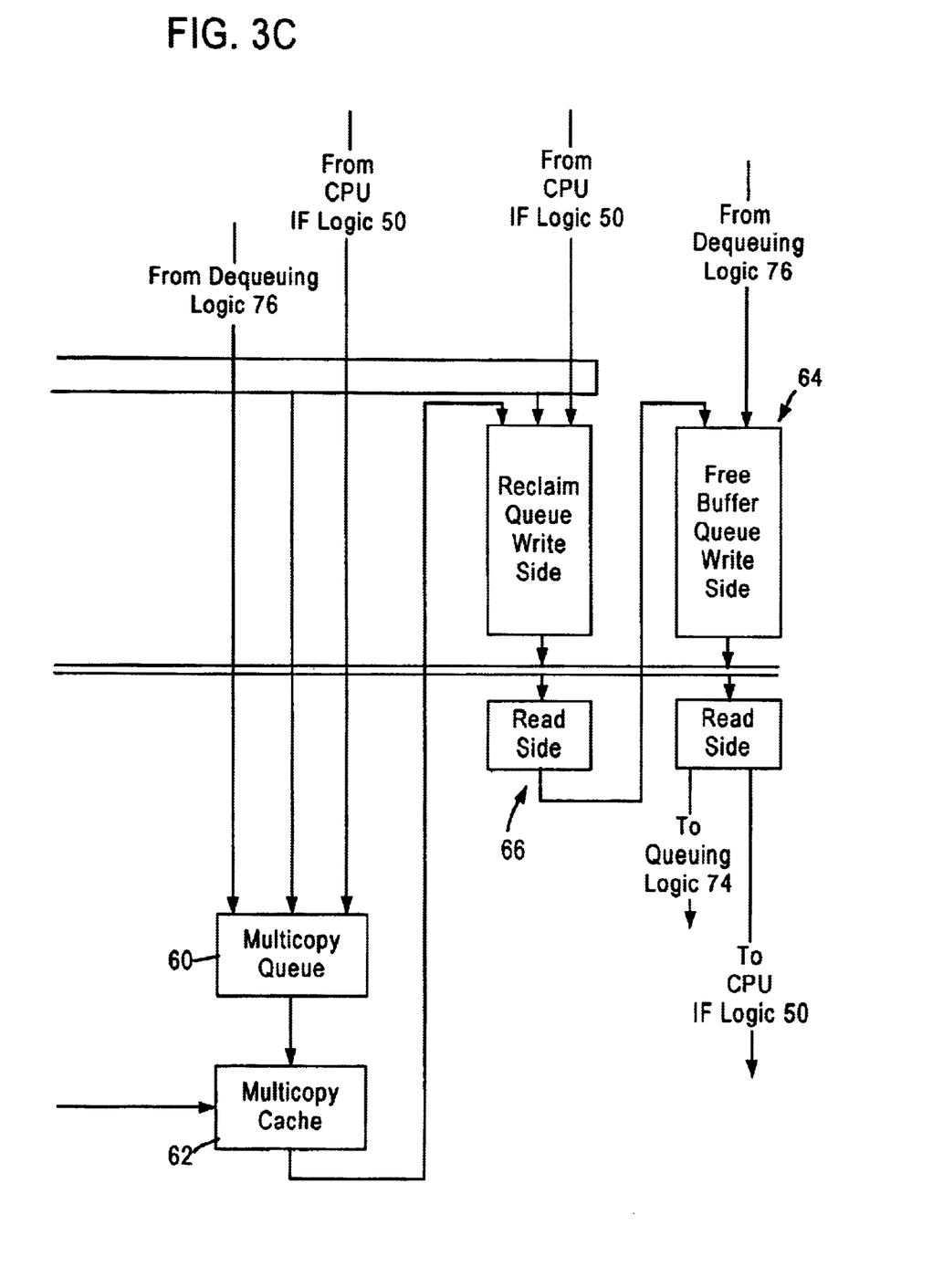

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided. First, the architecture of an exemplary expansion port 30 will be discussed, followed by the details for transferring data between switches 12.

VLAN Tag Manipulation

VLANs provide "broadcast domains" whereby broadcast traffic is kept "inside" the VLAN. For example, a specific VLAN may contain a group of users at a high level of an organization. When sending data to this group of users, the data may include a specific VLAN identifier associated with this particular group to ensure that only these users receive the data. These VLAN groupings can be thought of as "sub-networks" within a larger network. By isolating traffic in this manner, network security as well as response time is improved.

The present invention is directed to a network switch with capability to support use of untagged sets in a VLAN environment. An untagged set is a set of ports in which, if frames belonging to that VLAN are to be transmitted, the frames must be transmitted without VLAN tag headers. That is, ports belonging to the untagged set for a particular VLAN are not associated with that VLAN. This capability advantageously supports networking environments that do not employ VLANs. Also, the untagged capability allows stations with no VLAN software to operate with VLAN switches. For a port-based VLAN, the end station software need not be aware of any VLANs. The switch, for instance, may add a VLAN tag to a frame originating from the end station. The tagged frame can be passed unaltered from switch to switch until the last switch in the path strips off the VLAN tag before sending it to its destination. The destination could also be an end node that is not aware of VLANs.

As shown in FIG. 3, the egress logic—which in the preferred embodiment has a distributed architecture and includes the IRC 40, the port vector FIFO logic (PVF) 56, and the dequeuing logic 76 of the multiport switch 12—provides the above VLAN functional capability, among other functions. As previously indicated, the IRC 40 is responsible for making frame forwarding decisions. Towards this end, the IRC 40 contains an address table for MAC addresses (which may be unicast, multicast or broadcast), along with VLAN associations and port vectors. Upon receipt of a frame from one of its input ports, the IRC 40 looks up the destination address (DA) and VLAN combination in the address table to determine the port or ports to which the frame should be forwarded. The forwarding decision is then made according to the DA and the VLAN association. In an exemplary embodiment, the address table supports 4096 user addresses and 64 unique virtual local area networks (VLANs). However, the number of addresses and VLANs supported may be increased by expanding the table size. Alternatively, if cost considerations prevail over performance, the number of addresses and VLANs could be reduced.

The IRC 40 analyzes the header of a received data frame to determine the frame type; that is, whether it is untagged, VLAN-tagged, or priority-tagged. The IRC 40 searches an untagged set table, which is further described below, for the set of ports that are untagged for a particular VLAN. The IRC 40 then passes a forwarding descriptor that includes the frame type and an operational code (opcode) to PVF 56 (FIG. 3). The PVF 56 is responsible for creating a new opcode that instructs the dequeuing logic 76 to add, remove, modify the VLAN tag, or send the frame unmodified. The opcodes are generated by the PVF 56 on a per port basis.

Figure 5:
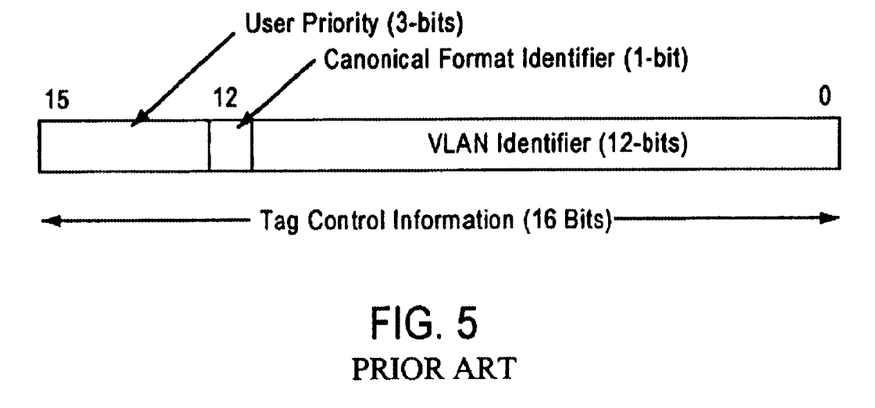
FIG. 5 is a diagram of a format of the Tag Control Information (TCI) field of FIG. 4b.

When the multiport switch 12 receives a frame, the IRC 40 snoops on the write transfers from the queuing logic 74 to the external memory 36a to obtain the frame pointer (pointing to the location in external memory 36a where the frame is stored), the receive port number, destination address (DA), source address (SA) and VLAN ID (if applicable). As stated above, frames are classified as either untagged, VLAN-tagged, or priority-tagged. An untagged Frame has no VLAN tag header. A VLAN tag header comprises a two byte VLAN Tag Protocol Identifier (TPID) followed by a two byte Tag Control Information field (TCI), as shown in FIG. 4b. The TPID field contains the reserved EtherType value 0x8100. FIG. 5 details the TCI format, which comprises a 3-bit User Priority Field, a 1-bit Canonical Format Indicator, and a 12-bit VLAN identifier (VLAN ID). A VLAN-tagged frame has a VLAN tag header with a non-zero VLAN identifier. Lastly, a priority-tagged frame has a VLAN tag header whose VLAN identifier is zero. Each incoming frame is assigned by the IRC 40 to a VLAN. If the frame is VLAN-tagged, the frame's VLAN is the VLAN ID in the VLAN tag header. If the frame is untagged or priority-tagged, the frame's VLAN is the port-based VLAN assigned to the input port at which the frame was received.

Figure 6:
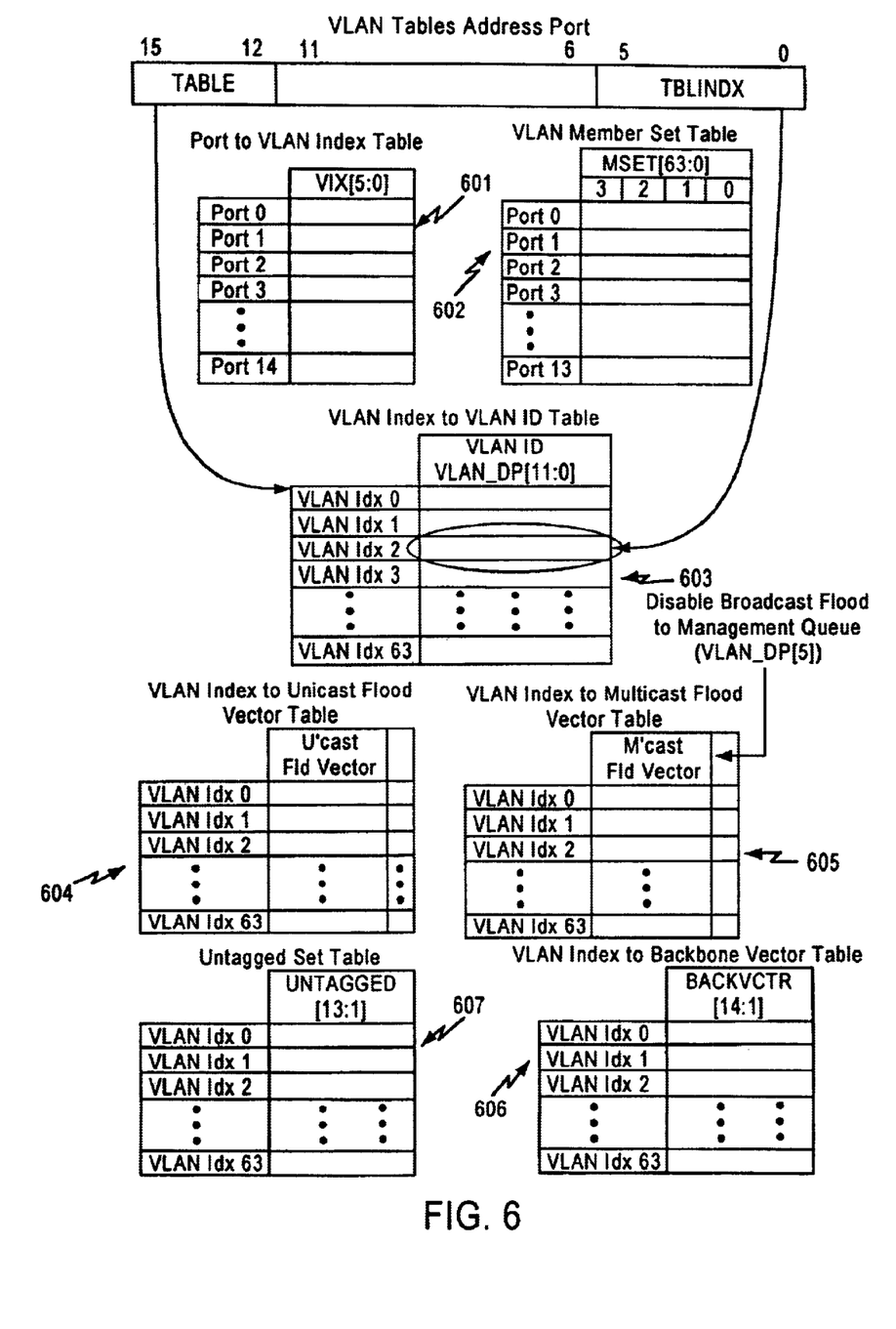
FIG. 6 is a block diagram of a virtual local area network address table in accord with an embodiment of the present invention.

FIG. 6 shows the seven VLAN tables utilized by the switch 12 to support VLAN capability. In an exemplary embodiment, these tables are managed by the host CPU 32 and referenced by the IRC 40. The Port to VLAN Index Table 601 associates a VLAN with a given port. The VLAN index is a 6-bit field used to reference a 12-bit VLAN identifier. Within this table, there exists thirteen 6-bit entries corresponding to ports 0 to 13. If a frame is received without a VLAN tag or with a VLAN tag that contains the NULL VLAN ID, the multiport switch 12 uses this table to assign to the frame a port-based VLAN that corresponds to the port on which the frame was received. An Untagged Set Table 607 stores the Untagged Sets (i.e., untagged set vectors) for all of the switch's active VLANs.

Another table, labeled VLAN Member Set Table 602, stores the necessary information to permit a port to be a member of more than one VLAN. Within the table 602, thirteen 64-bit entries are stored, corresponding to ports 0 to 13. As shown in FIG. 6, the 64-bit entries are categorized in four 16-bit sequences, whereby column 0 represents 16 lower order bits. Likewise, columns 1, 2, and 3 represent bits [31:16], bits [47:32], and the remaining higher order bits, respectively. Each 64-bit entry is a bit map that indicates which VLAN IDs are associated with the selected port. For instance, if bit n of the entry corresponding to port x is set, port x is in the member set for the VLAN whose index is n. VLAN index n in turn refers to a VLAN ID in the VLAN Index to VLAN ID Table 603. The IRC 40 uses the VLAN index found in the VLAN Index to VLAN ID Table 603 and performs a DA/VLAN index search. The IRC 40 identifies the forwarding port vector from the matched DA/VLAN index search.

A VLAN Index to Unicast Flood Vector Table 604 provides the forwarding port vector to which a unicast frame should be flooded in the event that a destination address and VLAN index (DA/VLAN_IDX) entry is not found for that unicast frame. The table consists of 64 15-bit entries, each entry corresponding to a particular VLAN Index. In similar fashion to the VLAN Index to Unicast Flood Vector Table 604, the switch 12 also utilizes a VLAN Index to Multicast Flood Vector Table 605 to supply a forwarding port vector indicating the ports that should be flooded with a multicast frame when a DA/VLAN_IDX entry is not found for that multicast frame.

If a DA/VLAN_IDX entry is not found when the switch 12 is operating in a "Desktop/Backbone" mode, the switch 12 utilizes a VLAN Index to Backbone Vector Table 606. The Desktop/Backbone mode allows the multiport switch 12 to operate in networks where the number of users exceeds the number of MAC addresses that are supported by the switch 12. In this mode, if the DA/VLAN_IDX search is unsuccessful, the frame is always forwarded to a backbone port vector. The host CPU 32 programs a 14-bit backbone port vector per VLAN Index in the VLAN Index to Backbone Vector Table 606. The table 606 stores 64 14-bit entries that respectively correspond to particular VLAN Indices. The table 606 supplies the forwarding port vector.

The last table, which is of particular interest to the present invention, is the Untagged Set Table 607. This table 607 stores 64 13-bit entries; each entry corresponds to a particular VLAN Index. The 13-bit sequence can be considered an untagged set vector in that the sequence is a bit map of the twelve 10/100 ports and the 1000 Mb/s uplink port; for example, if a bit corresponding to port n is set, port n is a member of the untagged set for this VLAN. Accordingly, frames that are transmitted out from port n will not have a VLAN tag header for that particular VLAN.

Figure 7:
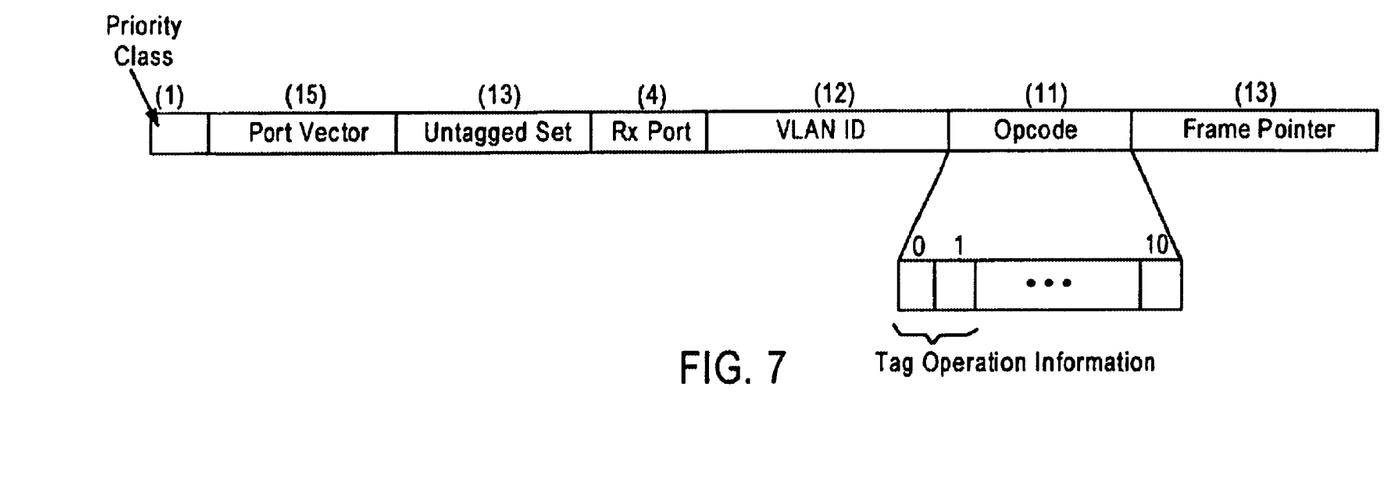
FIG. 7 is a diagram showing the format of the frame descriptor according to an embodiment of the present invention.

As previously noted, the IRC 40 searches the Untagged Set Table 607 to construct a forwarding descriptor from one of the 13-bit entries found in the table 607. An exemplary format of a forwarding descriptor is shown in FIG. 7. The first field is a 1-bit priority class field, which indicates priority of the output queues to which the frame pointer should be sent. The 15-bit port vector field is a bit map that indicates the port or ports designated to transmit the frame. Bit 0 corresponds to Port 0 (the Management Port). The twelve 10/100 ports are assigned bits 1–12. Bit 13 corresponds to the gigabit port 24, and bit 14 corresponds to the Expansion Port 30. The forwarding descriptor also contains, in one embodiment, a 4-bit receive port field that indicates the particular port from which the frame was received. Another field includes a 12-bit VLAN ID that is associated with the frame; the dequeuing logic 76 may have to create a VLAN tag header with this identifier.

In addition, the forwarding descriptor includes an opcode field, which is 11-bits in length. Bits [0:1] of the opcode provides tag operation information, which is described in greater detail below with respect to Table 3. The opcode field contains instructions that are used by the PVF 56 and the dequeuing logic 76 to determine operations that need to be performed on the frame before transmission. The opcode also has information used by management software to determine why a frame was forwarded to the management queue 68. Lastly, the forwarding descriptor has a 13-bit frame pointer field; this field provides the location of the frame in external memory 36.

Figure 8:
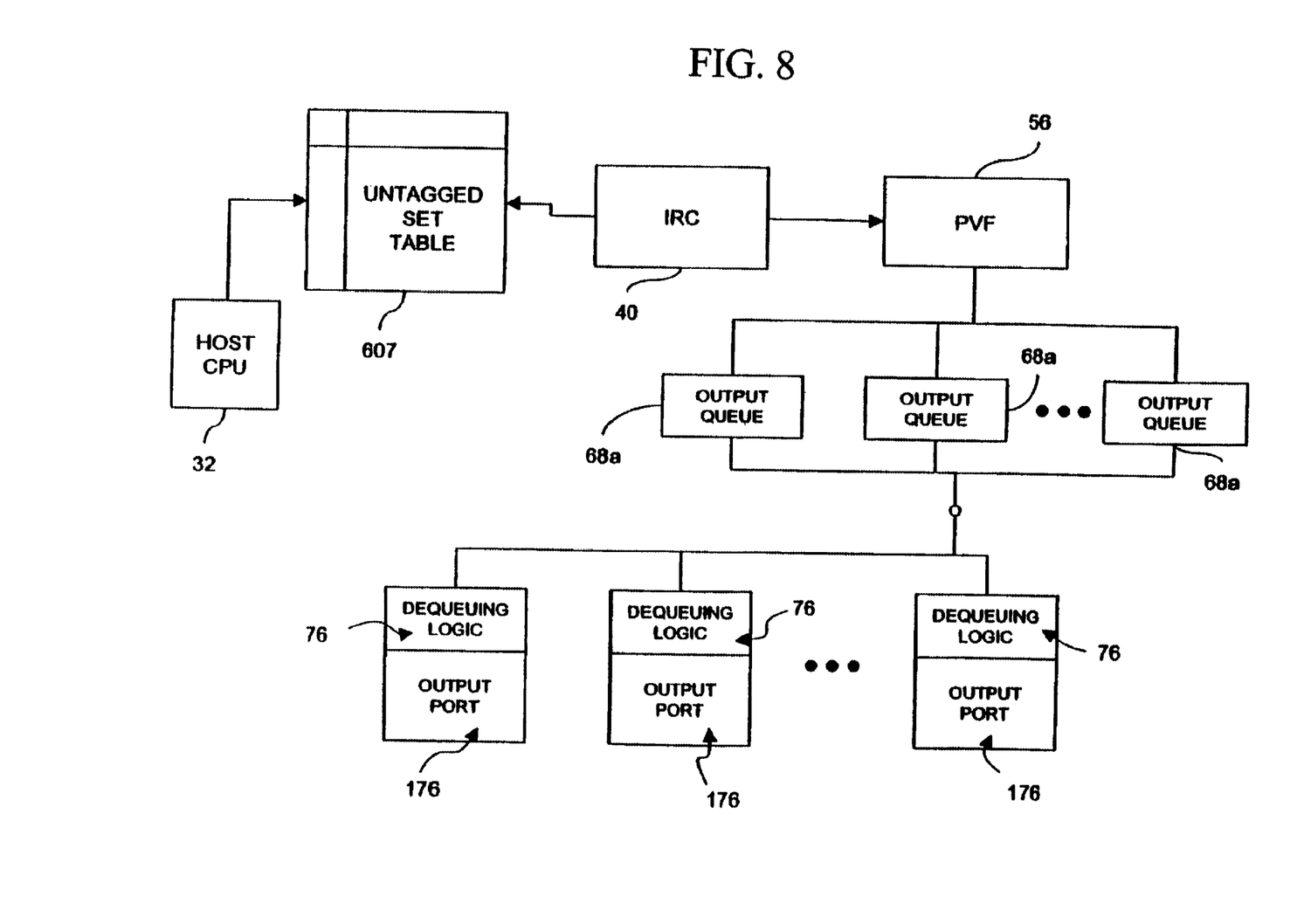
FIG. 8 is a block diagram illustrating the interaction among certain elements of the multiport switch in providing untagged set capability according to an embodiment of the present invention.

FIG. 8 provides a block diagram illustrating the elements of the switch 12 involved with providing untagged set capability per VLAN in accordance with an embodiment of the present invention. As shown, the host CPU 32 maintains the Untagged Set Table 607, which stores the untagged set vectors associated with each VLAN. With tagging and untagging of ports identified on a VLAN by VLAN basis, the IRC 40 searches the Untagged Set Table 607 upon receipt of each frame to determine which ports associated with a particular VLAN ID belong in the untagged set. This information is placed by the IRC 40 in the untagged set field of the forwarding descriptor. The IRC 40 in turn sends the forwarding descriptor to PVF 56. Because the forwarding descriptor includes the port vector field (as in FIG. 7), the PVF 56 knows which output ports 176 to direct the frame.

Using the untagged set and the opcode information within the forwarding descriptor, the PVF 56 individually generates a new opcode for each output queue 68*a* as dictated by the port vector. That is, the PVF 56 creates an individualized opcode for each output port 176 to be processed by their respective dequeuing logic 76. The individual output queues 68*a* are temporarily coupled to the individual dequeuing logic 76 during the transmission of the data frame. In this manner, each output port 176 can be independently instructed to strip, add, or modify the VLAN tag. Also, the frame may be output as received.

The opcode passed to the PVF 56 from the IRC 40 differs from the opcode created by the PVF 56 and passed to the output queues 68*a*. The PVF opcode (passed from the IRC 40) has a Frame Type field that indicates whether the received frame was untagged, priority-tagged, or VLAN-tagged. The output queue opcode (passed from the PVF 56) has a Tag Operation field that indicates whether the output port should strip, insert, or modify the frame's VLAN tag header or transmit the frame as received. Table 1 below shows the opcode descriptions for opcodes received by the PVF 56 from the IRC 40.

TABLE 1

Port Vector FIFO Opcodes

| Opcode Bits | Opcode Description |
|---|---|
| 10 | Unable to learn SA |
| 9 | SA learned |
| 8 | DA lookup failed and Management Queue is selected in the Port Vector |
| 7 | Traffic Capture |
| 6 | Unknown VLAN ID |
| 5-3 | 000 = GARP, MAC Control, or directed frame<br>001 = IGMP frame<br>010 = BPDU<br>011 = Error in received frame<br>100 = Other frame type<br>101–111 = Reserved |
| 2 | Expansion Port Cascade Tag<br>1 = Frame data in SSRAM includes Cascade Tag<br>0 = Frame data in SSRAM does not include Cascade Tag |
| 1-0 | Frame Type<br>00 = Reserved<br>01 = Untagged<br>10 = Priority-Tagged<br>11 = VLAN Tagged |

Table 2, as shown below, captures the opcode descriptions for the output queues 68a, which differ from the opcodes that are received by the PVF 56. The difference between the opcodes is how bits [0:1] are defined; bits [2:10] remain unchanged. In the case where the opcode is received by the PVF 56, these bits [0:1] specify the frame types: untagged, priority-tagged, or VLAN tagged. However, for the output queues 68a, bits [0:1] refer to the tag operations as indicated in the table below.

TABLE 2

Output Queue Opcodes

| Opcode Bits | Opcode Description |
|---|---|
| 1-0 | Tagging<br>00 = Transmit as received<br>01 = Strip Tag<br>10 = Insert Tag<br>11 = Modify Tag |

The output queue opcodes instruct the dequeuing logic 76 associated with each output port 176 to perform the tag operation as indicated by the opcode bits. When the opcode bits are set to 00, the dequeuing logic 76 does not modify the frame, but simply transmits the frame as received. This occurs under two different circumstances: when the frame is an untagged frame and the corresponding output port 176 is in the untagged set; and when the frame is a VLAN tagged frame and the output port 176 is not in the untagged set. The dequeuing logic 76 may also strip the frame's VLAN tag (i.e., the opcode bits are set to 01) if the frame is either priority-tagged or VLAN tagged and the output port 176 is a member of the untagged set. If the output port 176 is not a member of the untagged set for the frame's VLAN, the frame must be transmitted from that port with a VLAN tag header. Thus, if that frame arrived without a VLAN tag header, the dequeuing logic 76 must insert a tag with the VLAN ID associated with the receiving port; therefore, the opcode bits would be set to 10 in this case. If the frame were priority-tagged, the dequeuing logic 76 must replace the null VLAN ID in the VLAN tag header with the port-based VLAN-ID assigned to the input port. Under this scenario, the output queue opcode would be set to 11, which instructs the dequeuing logic 76 to modify the tag accordingly.

As discussed earlier, each multiport switch 12 also includes an expansion port 30, which can be implemented as a second gigabit MAC (GMAC) port, thereby enabling multiple multiport switches 12 to be cascaded together as a separate backbone network. The expansion port 30 is never a member of the untagged set. The downstream chip may need to add a VLAN tag to a frame that was received with no tag. If a frame on the expansion port 30 were not VLAN-tagged, the downstream switch would not know what VLAN ID to insert. Thus, all frames transferred over the expansion port 30 contain a cascade tag, while frames transferred over the other ports do not have such a tag. The Expansion Port Cascade Tag bit [2] in the opcode, shown in Table 2, indicates whether the frame stored in external memory 36a (i.e., SSRAM) contains a cascade tag. Specifically, if the frame contains a cascade tag, the bit [2] is set to 1. If a frame without a cascade tag is forwarded to the expansion port 30, the dequeuing logic 76 inserts the appropriate tag. If a frame that contains a cascade tag is forwarded to any other port, the dequeuing logic 76 strips the tag.

Table 3 below shows how the opcode bits [1:0] (i.e., tag operation information) are set by PVF 56 depending on the received frame type and whether or not the port is a member of the VLAN's untagged set.

TABLE 3

Bits [1:0] of Port Opcode

| | Untagged Set Bit for Tx Port | |
|---|---|---|
| Received Frame Type | 1 | 0 |
| Untagged | (00) Send As Is | (10) Insert Tag |
| Priority Tagged | (01) Strip Tag | (11) Modify Tag |
| VLAN Tagged | (01) Strip Tag | (00) Send As Is |

As mentioned previously, when the port is a member of the untagged set (Untagged Set Bit=1), an untagged frame is sent as is, while the other frame types (i.e., priority tagged and VLAN tagged) have their VLAN tags stripped. On the other hand, if the port is not a member of the untagged set (Untagged Set Bit=0), the dequeuing logic 76 inserts a VLAN tag if the frame is untagged, modifies the VLAN tag if the frame is priority tagged, or sends the frame unmodified if it is VLAN tagged.

When a forwarding descriptor is read from the output queue 68a, the dequeuing logic 76 starts copying frame data from external memory 36a (FIG. 1) to the MAC's transmit FIFO (not shown). It copies 8 bytes of data from external memory 36a each time the scheduler 80 (FIG. 3) grants access to the memory bus. The dequeuing logic 76 sources the address for each memory read access. At the beginning of the transfer, the dequeuing logic 76 examines the opcode field of the forwarding descriptor to determine whether a VLAN tag should be inserted, stripped, modified, or passed as received. It performs any necessary modifications to the frame while it is placing the frame data into the MAC transmit FIFO (not shown). This may require 4 bytes to be added to or removed from the 64-bit wide transfers and the frame data to be re-packed before being transferred into the MAC transmit FIFO (not shown). In one exemplary embodiment, when inserting a VLAN tag, the dequeuing logic 76 always sets the VLAN TPID to 0x8100, the user priority field of the VLAN TCI to 000b, and the canonical format identifier to 0b. If the opcode field of the forwarding descriptor indicates that the VLAN tag header should be inserted, stripped, or modified, the MAC 20 calculates a new FCS for the frame. Otherwise, the MAC 20 transmits the FCS field that it reads from external memory 36a.

According to the disclosed embodiments, the multiport switch 12 provides the capability to support LANs and VLANs. The rules checker 40 creates a forwarding descriptor based upon information retrieved from an Untagged Set Table. This forwarding descriptor is sent to the PVF 56, which modifies the opcode field of the descriptor to embed instructions to the individual dequeuing logic 76. In turn, the dequeuing logic 76 executes the instruction to either add, remove, modify or not modify a VLAN tag on a per port basis. Under this approach, the multiport switch 12 can accommodate both tagged and untagged frames in a manner that enhances frame processing efficiency and switch reliability.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A multiport switch configured for transferring a data frame to a network node, comprising:
   a plurality of output ports for transmitting the data frame;
   rules checker logic for determining a type of data frame based upon header information associated with the data frame and for generating a corresponding forwarding descriptor; and
   port logic for receiving the forwarding descriptor and for generating a modified forwarding descriptor in response to the received forwarding descriptor, the modified forwarding descriptor comprising an operation code indicating a tag operation for modifying the data frame based upon the frame type and untagged set information, the untagged set information specifying on a VLAN by VLAN basis which one or more of the output ports is a member of an untagged set;
   wherein the tag operation comprises one of:
      inserting a VLAN tag into the header information,
      stripping the VLAN tag from the header information,
      modifying the VLAN tag of the header information, and
      transmitting the data frame via one or more of the outputs without modifying the VLAN tag of the header information.

2. The multiport switch as in claim 1, wherein each of the output ports is coupled to a corresponding dequeuing logic, the dequeuing logic being configured for receiving the modified forwarding descriptor from the port logic and for executing the corresponding tag operation.

3. The multiport switch as in claim 1, wherein types of data frame comprise an untagged type indicating that the data frame does not include a VLAN tag, a priority-tagged type indicating that the data frame has queuing priority, and a VLAN-tagged type indicating that the data frame includes a VLAN tag.

4. The multiport switch as in claim 3, wherein the operation code indicates the tag operation of: inserting the VLAN tag if the data frame is of the untagged type and a corresponding one of the output ports is not a member of the untagged set; stripping the VLAN tag if the data frame is of the priority-tagged type or VLAN-tagged type and the corresponding one of the output ports is a member of the untagged set; modifying the VLAN tag if the data frame is of the priority-tagged type and the corresponding one of the output ports is not a member of the untagged set; or transmitting the data frame via the corresponding one of the output ports without modifying the VLAN tag if the data frame is of the VLAN tagged type and the corresponding one of the output ports is not a member of the untagged set.

5. The multiport switch as in claim 1, further comprising a untagged set table for storing the untagged set information.

6. The multiport switch as in claim 5, wherein the untagged set table is managed by a host central processing unit (CPU).

7. The multiport switch as in claim 1, wherein the VLAN tag comprises a VLAN Tag Protocol Identifier (TPID) field and a Tag Control Information (TCI) field in compliance with IEEE 802.1d standard.

8. A method for processing a data frame, comprising the steps of:
   determining data frame type based upon header information associated with the data frame and generating a corresponding forwarding descriptor by a first logic;
   receiving the forwarding descriptor a second logic; and
   generating a modified forwarding descriptor based upon the received forwarding descriptor by the second logic, the modified forwarding descriptor comprising an operation code indicating a tag operation for modifying the data frame based upon the frame type and untagged set information, the untagged set information specifying on a VLAN by VLAN basis which one or more of a plurality of output ports is a member of an untagged set;
   wherein the tag operation comprises one of:
      inserting the VLAN tag into the header information,
      stripping the VLAN tag from the header information,
      modifying the VLAN tag of the header information, and
      transmitting the data frame via one or more of the outputs without modifying the VLAN tag of the header information.

9. The method as in claim 8, wherein the first logic in the step of determining is a rules checker logic.

10. The method as in claim 8, wherein the second logic in the steps of receiving and generating is a port logic.

11. The method as in claim 8, wherein each of the output ports is coupled to a corresponding dequeuing logic, the dequeuing logic being configured for receiving the modified forwarding descriptor and for executing the corresponding tag operation.

12. The method as in claim 8, wherein types of data frame comprise an untagged type indicating that the data frame does not include a VLAN tag, a priority-tagged type indicating that the data frame has queuing priority, and a VLAN-tagged type indicating that the data frame includes a VLAN tag.

13. The method as in claim 12, wherein the operation code indicates the tag operation of: inserting the VLAN tag if the data frame is of the untagged type and a corresponding one of the output ports is not a member of the untagged set; stripping the VLAN tag if the data frame is of the priority-tagged type or VLAN-tagged type and the corresponding one of the output ports is a member of the untagged set; modifying the VLAN tag if the data frame is of the priority-tagged type and the corresponding one of the output ports is not a member of the untagged set; or transmitting the data frame via the corresponding one of the output ports without modifying the VLAN tag if the data frame is of the VLAN tagged type and the corresponding one of the output ports is not a member of the untagged set.

14. The method as in claim 8, further comprising storing the untagged set information in an untagged set table.

15. The method as in claim 14, wherein the untagged set table is managed by a host central processing unit (CPU).

16. The method as in claim 8, wherein the VLAN tag comprises a VLAN Tag Protocol Identifier (TPID) field and a Tag Control Information (TCI) field in compliance with IEEE 802.1d standard.

* * * * *